A. KOVACS.
POWER TRANSMISSION MECHANISM.
APPLICATION FILED AUG. 12, 1908.
936,458.
Patented Oct. 12, 1909.
4 SHEETS—SHEET 1.
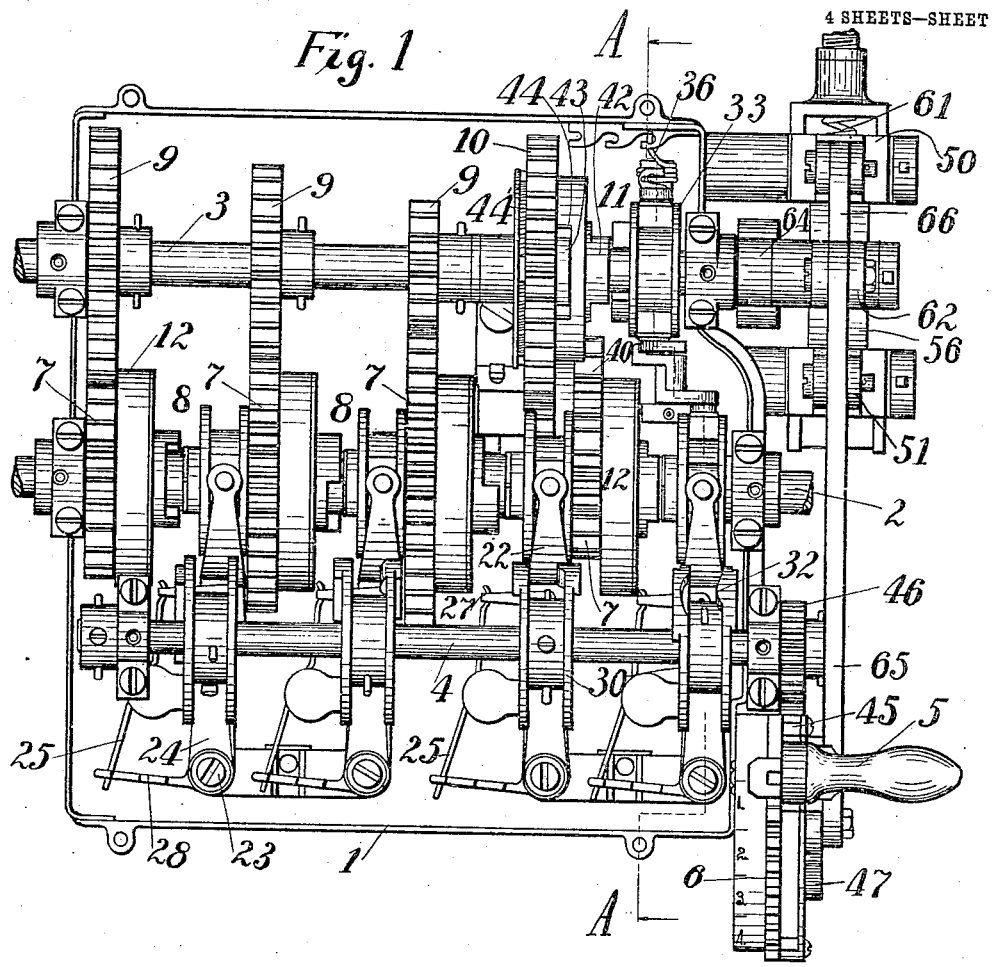
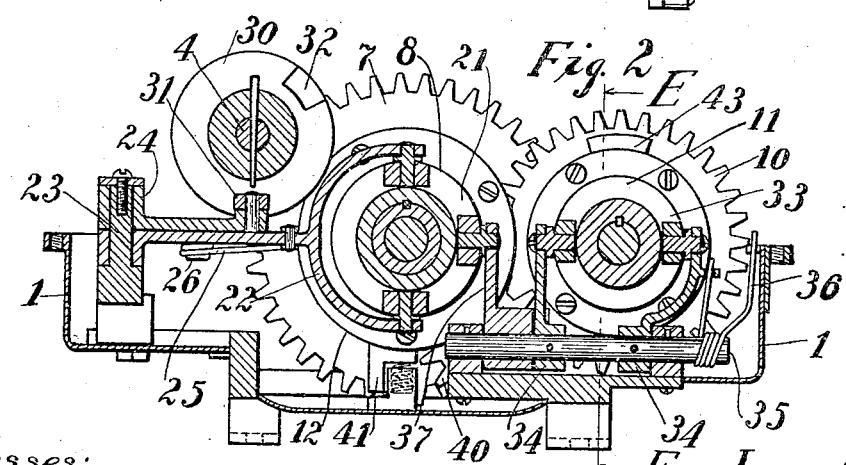

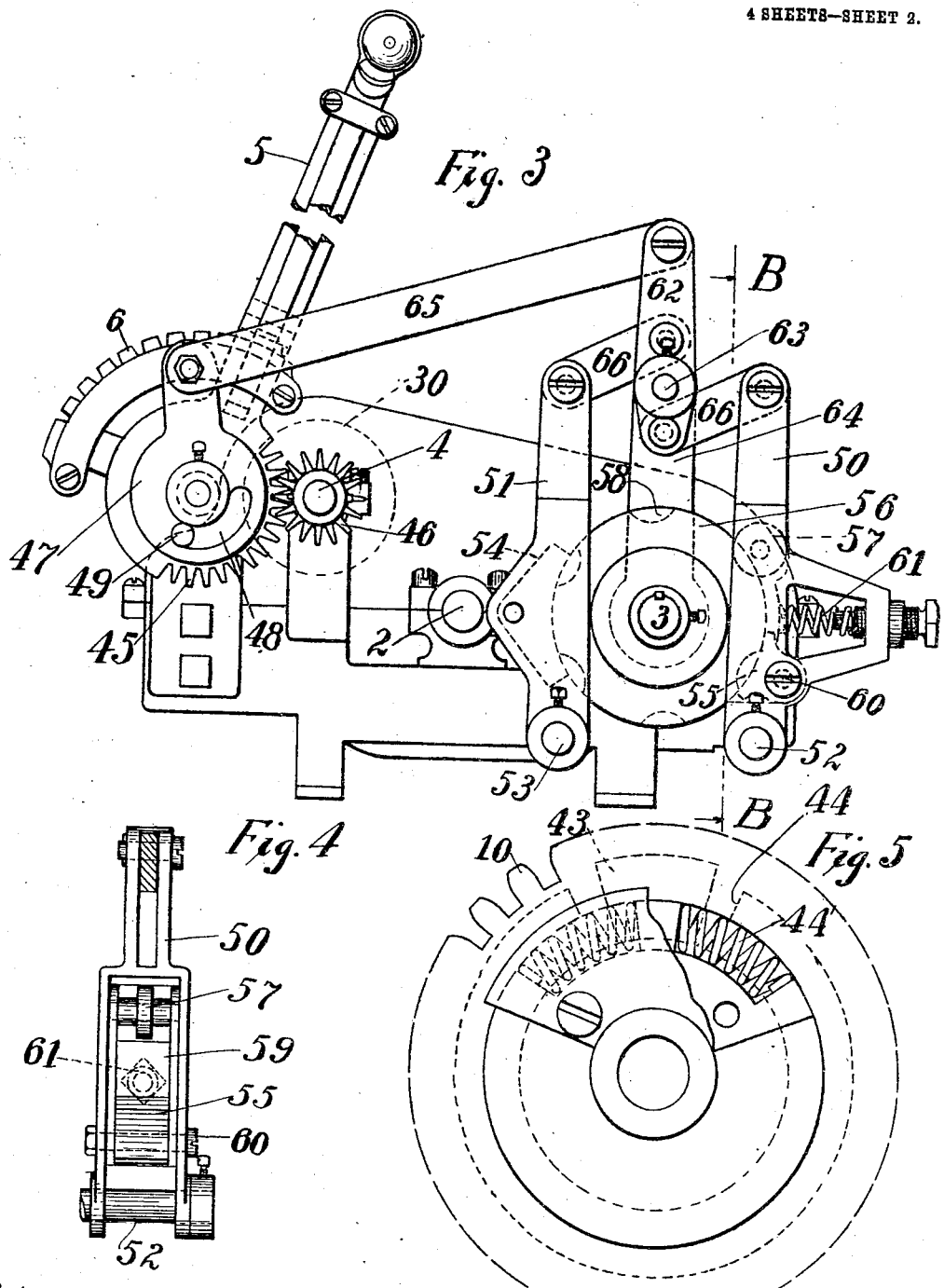

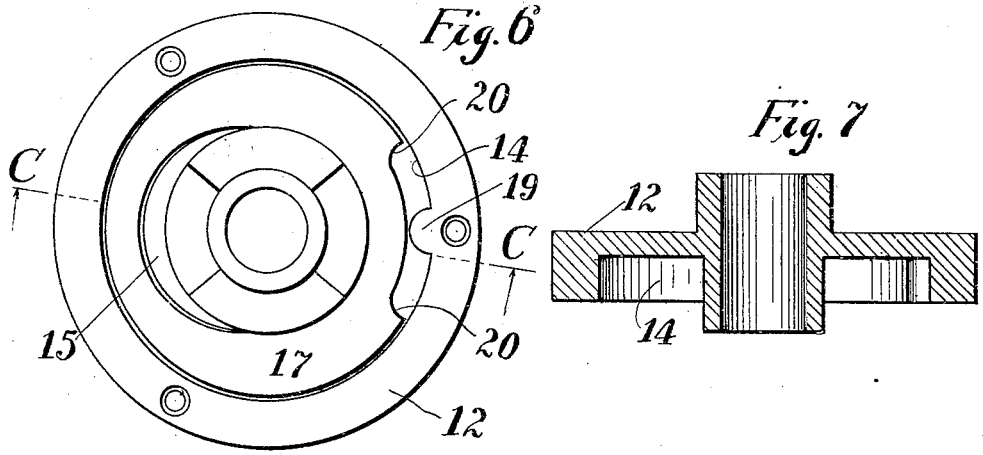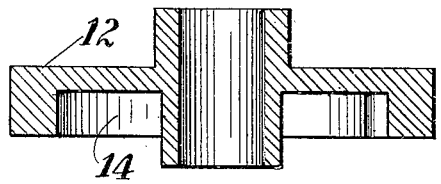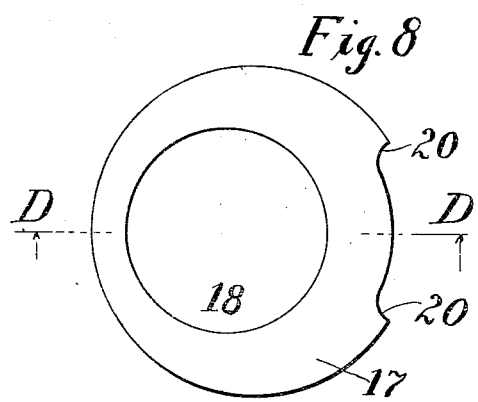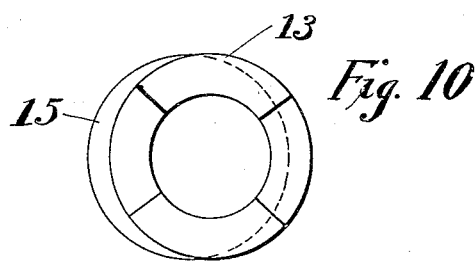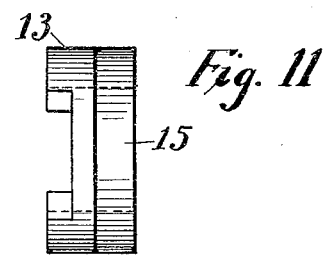

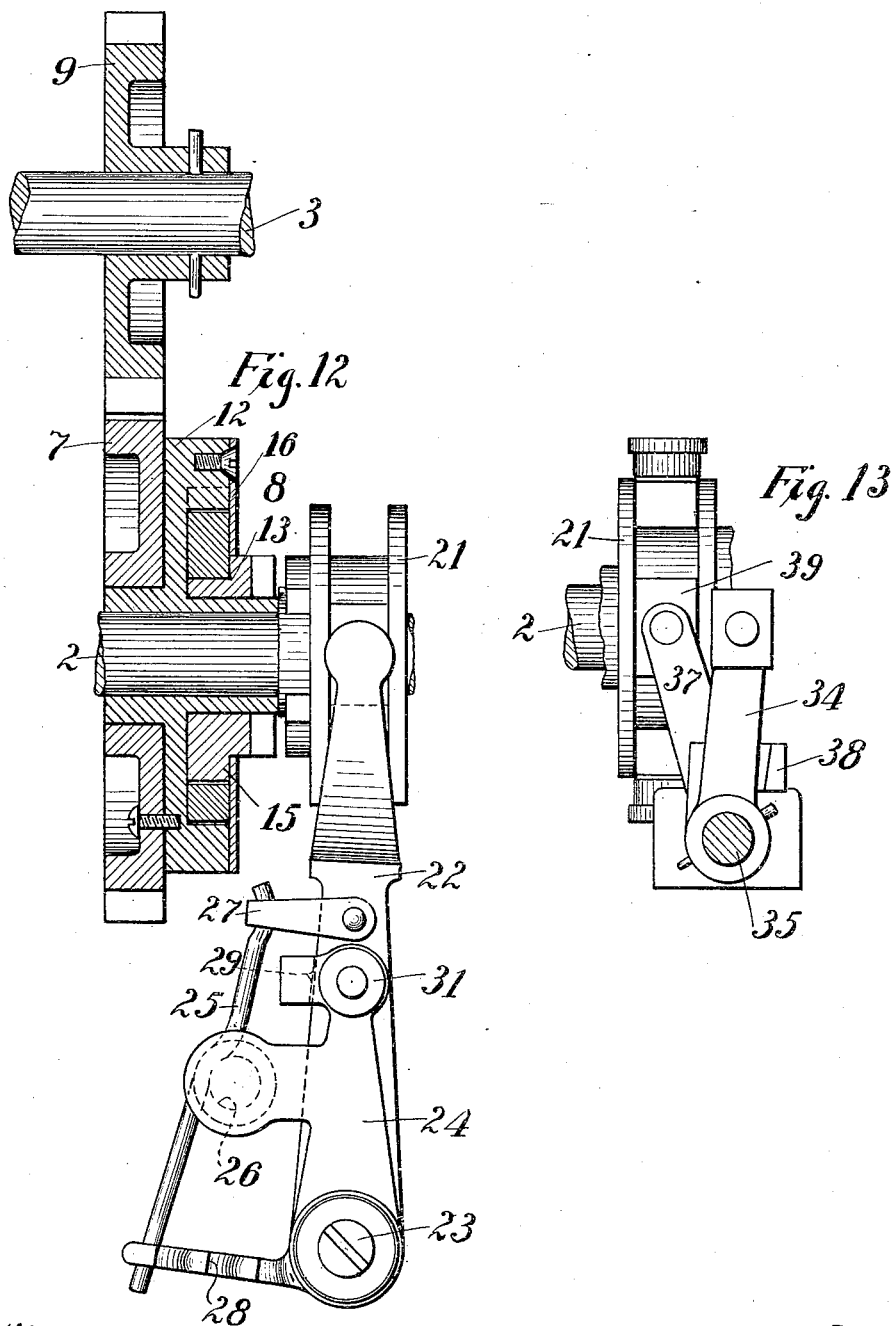

UNITED STATES PATENT OFFICE.

ALEXANDER KOVACS, OF CHICAGO, ILLINOIS.

POWER-TRANSMISSION MECHANISM.

936,458.  Specification of Letters Patent.  Patented Oct. 12, 1909.

Application filed August 12, 1908.  Serial No. 448,178.

*To all whom it may concern:*

Be it known that I, ALEXANDER KOVACS, a citizen of the United States of America, and a resident of Chicago, county of Cook, State of Illinois, have invented certain new and useful Improvements in Power-Transmission Mechanisms, of which the following is a specification.

The main objects of this invention are to provide an improved form of power transmission mechanism wherein the shifting of gears into and out of mesh with each other is avoided, and wherein the changing of speeds is accomplished by putting different trains of gears into operation by means of clutches; to provide an improved mechanism of this kind provided with improved means for preventing sudden shock to the gear teeth and thereby avoiding breakage thereof; to provide improved means for operating the clutches in a system of this character; to provide an improved form of combined friction and interlocking clutch mechanism whereby motion may be gradually applied to the gearing and thereby avoid risk of breaking the teeth of the gears; and to provide improved means for completely stopping the driven shaft of a power transmission mechanism of this character through a simple movement of the same operating element by means of which the speed is controlled.

These objects are accomplished by the device shown in the accompanying drawings, in which—

Figure 1 is a top plan of a power transmission mechanism constructed according to this invention, the upper part of the casing being removed to disclose the mechanism within. Fig. 2 is a section of the same taken on the irregular line A—A of Fig. 1. Fig. 3 is an elevation viewed from the right of Fig. 1. Fig. 4 is a sectional detail taken on the line B—B of Fig. 3. Fig. 5 is a detail showing the construction of the buffer which is interposed between the gear 10 and the driven shaft. Fig. 6 is a detail of one of the combined friction and interlocking clutch mechanisms which connect the driving shaft with the changeable speed gear trains. Fig. 7 is a sectional detail taken on the line C—C of Fig. 6. Fig. 8 is a detail of the eccentric friction shoe which forms a part of the mechanism shown in Fig. 6. Fig. 9 is a section on the line D—D of Fig. 8. Fig. 10 is a detail of the combined cam and clutch element. Fig. 11 is a side elevation of the same. Fig. 12 is an enlarged detail viewed from above, illustrating the arrangement of the clutch operating levers and their relation to the clutch mechanism, some of the parts of the clutch and the gears being shown in section. Fig. 13 is a sectional detail of the lever mechanism whereby the reverse speed clutch on the driven shaft is operated through the operation of the corresponding clutch on the driving shaft, said section being taken on the line E—E of Fig. 2.

The device shown in the drawings is a variable speed power transmission mechanism particularly designed for controlling a motor driven vehicle. In the construction shown, there is a plurality of trains of gears, one for each different speed, and these trains are all inclosed in a casing 1, which is preferably dust-proof and oil-tight. This casing is preferably made in two sections, the upper section or cover being removable without disturbing the operative relation of the various parts of the mechanism. In the construction shown, the driving shaft 2 and driven shaft 3 are parallel to each other, and each train of gears is provided with an individual clutch which is operated by means of a cam carried by the common cam shaft 4 which is rotated through intermediate mechanism by means of a controller element 5, represented in the form of the usual controller lever, and provided with a spring pressed detent for locking it in different angular positions with respect to the notched sector 6. The first gear 7 of each speed train is loose upon the driving shaft 2, or otherwise journaled to rotate about the axis thereof, and is adapted to be connected with said shaft by means of a combined friction and interlocking clutch mechanism 8 which is especially designed to prevent shock to the gear teeth while at the same time insuring positive driving of the driven shaft. The gears 9 of the different speed trains corresponding to speeds in the normal or forward direction are keyed to the driven shaft 3, while the gear 10 of the reverse speed train is loose upon the driven shaft, but is connected thereto, when in use, by means of a clutch 11, which will be hereinafter described. The clutch mechanism 8 which connects the gear 7 of each speed train with the driving shaft 2 comprises a part 12 which is rigidly secured to the gear 7, but loose upon the shaft 2, being, however, secured against shifting along said shaft 2. The clutch element 13 is loosely mounted upon the hub of the part 12 concentrically within the annular friction surface 14 on the inner face of the flange of the part 12. The clutch element 13 has integrally formed thereon a circular cam 15 disposed eccentrically with respect to the friction surface 14.

Interposed between the cam 15 and the flange of the part 12, and inclosed by the cover plate 16 which is attached to said flange, is a friction shoe 17 which has a substantially circular outer periphery and a circular aperture 18 located eccentrically with respect to its outer periphery. The shoe is thus thicker in a radial direction at one side than at the other, and is symmetrical with respect to the diameter which bisects the thick and thin sides. The outer periphery of the shoe at the thick side is recessed to receive a shoulder 19 on the part 12 and provide the shoulders 20, against which the shoulder 19 abuts to limit the relative rotation, in either direction, of the shoe 17 with respect to the part 12.

The clutch member 13 is confined against shifting longitudinally of the shaft 2 by means of the cover plate 16, as will appear from Fig. 12. The clutch member 13 is provided with a shouldered clutch face adapted to engage the oppositely formed clutch face of a clutch member 21, which member is splined to the shaft 2 so as to be slidable thereon, but rotated therewith. The clutch member 21 has an annular groove in its periphery to receive the arms of a forked lever 22 by means of which the clutch member 21 is shifted. The lever 22 is fulcrumed on a stud 23 which also carries a second lever 24. The lever 24 is connected with the lever 22 through the spring 25 which is coiled around a stud 26 on the lever 24 and has one end engaging a link 27 which is pivotally connected to the lever 22 (see Fig. 12). The lever 24 is provided with a branch arm having a series of shoulders 28 against which the other end of the spring 25 bears. By shifting the spring 25 to different shoulders 28, the tension of the spring 25 may be varied. There is a shoulder 29 on the arm 24 which extends downward at one side of the lever 22 so that when the lever 24 is shifted toward the right of Fig. 12, the lever 22 will be carried with it.

In order to provide for throwing the clutches 8, the shaft 4 is provided with a series of cams 30, one for each clutch. Each of these cams consists of a cylindrical block having a groove in its periphery in which is seated a roller stud 31 carried by the lever 24. The groove of the cam is offset at 32 so that during the rotation of the cam the clutch member 21 will be in its "off" or disengaged position during the greater part of the rotation of the cam, but will be shifted when the offset 32 registers with the roller stud 31. The offsets 32 of the different cams are located at successively different angular positions with respect to the shaft 4, so that during the rotation of said shaft the clutches 8 will be successively shifted into and out of their engaged positions. The springs 25, which bear between the levers 22 and 24, permit the lever 24 to be positively shifted by the cam, regardless of whether the faces of the clutch members are in registering position or not. After the shifting of the lever 24, the spring 25 draws the clutch members into engagement with each other as soon as their clutch faces register. When the respective cam 30 is further rotated, the arm 24 is shifted back to its normal position, and the stud 29 thereupon swings the lever 22 back to its normal position and releases the clutch.

The clutch 11, which connects the gear 10 with the driven shaft 3, is operated by mechanism somewhat similar to that which operates the clutches 8, as will be seen from Figs. 1, 2, and 13. The shiftable member 33 of the clutch 11 is operated by studs on the arms 34 which are carried by the shaft 35. A spring 36 normally urges the clutch member 33 into its engaged position, but said member is normally held in its disengaged position by the arm 37 which has a lug 38 located so as to bear against one side of the adjacent arm 34, and also has a stud provided with a shoe 39 engaging the groove in the clutch member 21 which controls the reverse speed train of gears. In this manner the clutch member 33 is prevented from being shifted into its engaged position except when the corresponding clutch member 21 is in its engaged position. The reverse speed train includes, besides the gear 10 and the respective gear 7, one or more intermediate gears 40. In order to prevent the reverse train of gears from rotating through friction with their shafts when both of the clutches which control said train are open, there is provided a spring pressed shoe 41 which bears against the periphery of the part 12 and produces friction enough to resist rotation. In the case of the clutch 11, the clutch member 42 has a limited amount of angular movement with respect to the gear 10 as determined by the play of the lug 43 between the shoulders 44, and said lug 43 is normally held midway between the shoulders 44 by means of a pair of springs 44'. These springs serve as a buffer to absorb the shock when the reverse train of gears is suddenly thrown into service.

The cam shaft 4 is operated by the operating element 5 which rotates the sector 45, meshing with the pinion 46. Journaled in axial alinement with the sector 45 is a disk 47 which is mounted toward one side to form a lever for operating the brake mechanism, by means of which rotation of the driven shaft 3 is stopped. The disk 47 is slotted at 48 to receive a stud 49 carried by the sector 45. The slot 48 is so disposed and of such length that the operating element 5 may be shifted to its various positions for changing the speed of the driven shaft 3 without affecting the brake mechanism. When, however, the operating element 5 is thrown to the extreme limit of its movement toward the right of Fig. 3, the stud 49 engages the disk 47 at the end of the slot 48 and sets the brake mechanism, as will hereinafter appear.

The brake mechanism comprises a pair of levers 50 and 51 pivoted at 52 and 53 respectively at opposite sides of the shaft 3, and each carries a brake shoe 54 and 55 which engage the periphery of a brake disk 56. The brake shoes are pivoted so as to readily accommodate themselves to the surface of the disk 56. In order to assist the brake shoes in stopping the rotation of the shaft 3 and quickly stop the same, the lever 50 is provided with a spring pressed roller detent 57, and the disk 56 is provided with a series of annular recesses 58 fitting the detent 57. The roller detent 57 and the recesses 58 are considerably narrower than the rim of the disk 56, so that the brake shoes will ride freely over said recesses. The roller detent 57 is journaled in a forked arm 59 which straddles the shoe 55 and is carried by the same pivot 60. A compression spring 61 bears between a yoke on the lever 50 and the arm 59, and normally urges the detent 57 into engagement with the periphery of the disk 56. The tension of the spring is readily adjustable, as will appear from Fig. 3. A lever 62 is pivotally mounted at 63 on an arm 64 loosely mounted on the shaft 3. This lever is connected with the disk 47 by means of a link 65 and is connected with the levers 50 and 51 by the link 66. The fact that the arm 64 is loose upon the shaft 3 permits it to swing slightly so as to allow it to move sufficiently to permit the brake shoes to have an equal bearing upon the disk 56.

The operation of the device shown is as follows:—The offsets 32 of the cams 30 are so located with respect to each other that each clutch will be completely opened before the succeeding clutch is shifted to its engaged position, and the notched sector 6 is provided with intermediate notches located between the notches corresponding to successive speeds, so that when the controller element 5 is set to any speed, the driven shaft 3 may be completely disconnected from the driving shaft 2 by shifting the controller element the space of one notch in either direction. When the controller element is shifted to the notch corresponding to a particular speed ratio between the driving and driven shafts, the offset of the cam 30 which corresponds to such speed ratio will register with the roller stud 31 of the respective arm 24, shifting said arm so as to throw the respective clutch 8 into its engaged position. If the two clutch members are not in position to register, the spring 25 will yield to permit the movement of the arm 24 and will throw the clutch members into engagement as soon as they arrive at a registering position. On shifting the controller element to a notch corresponding to another speed, the rotation of the cam shaft 4 first releases the clutch of the previous speed and then causes the engagement of the clutch corresponding to the desired speed. As soon as the members of either of the clutches 8 engage each other, the clutch member 13 will rotate with the member 21, and the cam 15 will instantly cause the dog 17 to be wedged into frictional engagement with the friction surface 14 of the part 12. The friction between the dog 17 and the friction surface 14 causes the dog to be urged into continuously stronger gripping engagement with the friction surface 14, until all slipping between the dog 17 and the part 12 is prevented by the engagement of the shoulder 19 with one of the shoulders 20. There is thus a gradual application of the load from the shaft 2 to the shaft 3, and sudden shock upon the teeth of the gears is effectually prevented. When the clutch 8 of the reverse train of gears is thrown into its engaged position, the shifting of the member 21 will swing the arm 37, withdrawing the lug 38 and allowing the arms 34 to shift the clutch member 33 into engagement with the member 42 on the driven shaft. The shock due to the sudden throwing in of the clutch 8 is taken up by the friction mechanism within the part 12, and the further shock which is due to the throwing in of the clutch 11 is taken up by the buffer springs 44′. When the controller element 5 is thrown to the limit of its movement toward the right of Fig. 3, the stud 49 swings the disk 47 and through the link 65 and lever 62 draws the brake levers 50 and 51 toward each other, causing the brake shoes to grip the periphery of the disk 56. The resistance offered by the roller detent 57, in addition to the friction of the brake shoes, rapidly brings the shaft 3 to a complete stop and prevents further rotation of said shaft until the controller element 5 is shifted away from its braking position.

What I claim as my invention and desire to secure by Letters Patent is:—

1. In a power transmission mechanism, the combination of a driving and a driven shaft; mechanism adapted to drive said shafts at a plurality of different speeds, a movable controller element adapted when shifted to change the relative speeds of said shafts, a brake wheel fixed on said driven shaft and having a recess therein, a brake shoe movable into and out of engagement with said wheel, a detent movable into and out of engagement with said wheel, being located to register with said recess and normally urged to enter said recess when in its engaged position, and means connecting said shoe and detent with said controller element for shifting said shoe and detent through a certain movement of said controller element.

2. In a power transmission mechanism, the combination of a driving and a driven shaft, mechanism adapted to drive said shafts at a plurality of different speeds, a movable controller element adapted when shifted to change the relative speeds of said shafts, a brake wheel fixed on said driven shaft and having a recess therein, a brake shoe movable into and out of engagement with said wheel, a roller detent movable into and out of engagement with said wheel, being located to register with said recess and normally urged to enter said recess when in its engaged position, and means connecting said shoe and detent with said controller element for shifting said shoe and detent through a certain movement of said controller element.

3. In a power transmission mechanism, the combination of a driving and a driven shaft, mechanism adapted to drive said shafts at a plurality of different speeds, a movable controller element adapted when shifted to change the relative speeds of said shafts, a brake wheel fixed on said driven shaft and having a recess therein, a brake shoe movable into and out of engagement with said wheel, a detent movable into and out of engagement with said wheel, being located to register with said recess and normally urged to enter said recess when in its engaged position, and means connecting said shoe and detent with said controller element for shifting said shoe and detent through a certain movement of said controller element, said detent being free to yield without affecting the engagement of said shoe.

Signed at Chicago this 8th day of August, 1908.

ALEXANDER KOVACS.

Witnesses:
EUGENE A. RUMMLER,
MARY M. DILLMAN.